Figure 1:
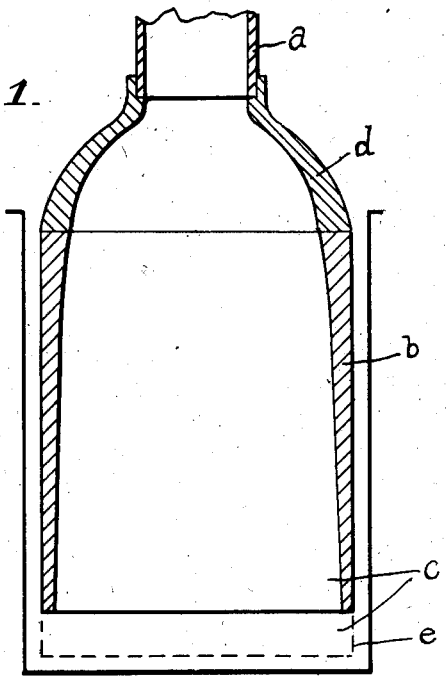

May 3, 1927. 1,626,847

R. LECHTHALER

APPARATUS FOR THE MANUFACTURE OF HOLLOW BODIES FROM FIBROUS PULP

Filed Feb. 12, 1925

INVENTOR.
R. Lechthaler
BY Marks & Clerk
ATTORNEYS.

Patented May 3, 1927.

1,626,847

UNITED STATES PATENT OFFICE.

ROBERT LECHTHALER, OF BERLIN-CHARLOTTENBURG, GERMANY, ASSIGNOR TO BAUMGÄRTNER, DR. KATZ & CO., G. M. B. H., OF SPANDAU-EISWERDER, GERMANY, A CORPORATION OF GERMANY.

APPARATUS FOR THE MANUFACTURE OF HOLLOW BODIES FROM FIBROUS PULP.

Application filed February 12, 1925, Serial No. 8,839, and in Germany February 12, 1924.

This invention relates to an apparatus for the manufacture of hollow bodies from fibrous pulp, for instance paper pulp, by means of a heated gaseous pressure medium (steam, gas, compressed air and the like) with the employment of moulds having pervious walls and capable of being taken apart.

The invention consists in this, that the mould for making the hollow bodies is higher than the hollow bodies to be made. The moulding takes place, as is well known, only at the places having pervious walls. The mould is so constructed that the upper part has not pervious walls. This is effected for instance by an impervious metal sheet being fixed at the top and by placing it around the pervious wall also for providing the means for guiding the pressure medium. This also provides a firm supporting surface for the head of the mould. A constructional example of the invention is shown diagrammatically in the drawing in section. The pressure medium passes through the supply pipe $a$ (Fig. 1) after flowing through the head $d$ of the mould into the interior of the mould $c$. The upper end of the mould is made impervious to air, for instance by the provision of a solid sheet of metal $b$. The lower part of the mould $c$ is pervious, including the lower end of the mould. The lower edge of the head $d$ of the mould rests on the impervious sheet metal part $b$.

The apparatus operates in the following manner:—In the first place, through the head part $d$ resting firmly on the part $b$, the pressure medium is prevented from blowing through at an undesirable place. The arrangement also prevents the pressure medium from striking too strongly against the upper part of the pervious part of the mould. The pressure medium will first while at full pressure sweep along the impervious sheet metal or other impervious upper surface of the mould and will then pass along the side walls of the mould in a downward direction. By changing the impervious or sheet metal part it is possible to mould vessels of different height in the same mould, without the necessity of introducing the head of the mould further into the mould or keeping a stock of moulds for each size of vessel. Finally, low vessels (for instance the lids of boxes) can be made with a satisfactory end, as through the greater distance between the entrance of the pressure medium and the end of the vessel to be moulded, the impact of the pressure medium on the material is weaker.

Figure 2:
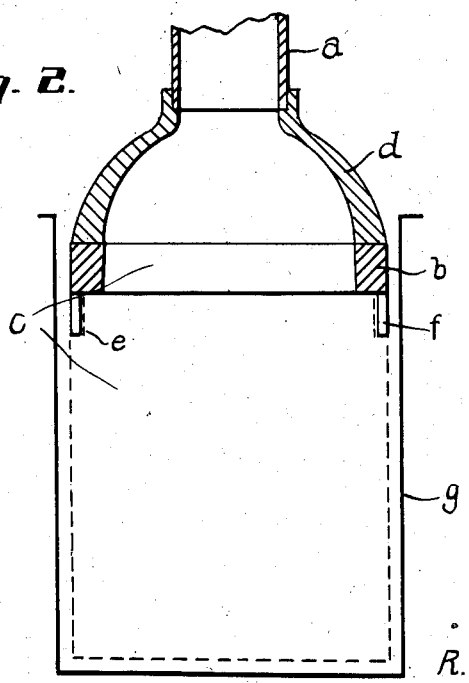

In Fig. 2 a further modification of the invention is shown also in section. In this case an inserted part $e$ of pervious sheet metal is provided, which is fixed to an auxiliary frame $f$, which is located behind the frame $g$ of the mould, so that the inserted perforated metal sheets will have the desired position with respect to one another at the place, at which the rebate or the main part of the article is to be produced. The said auxiliary frame is removable and can be placed where the article to be moulded is to have the rebate. Thus with a single mould hollow bodies may be made having a rebate of different length at different positions.

With the new apparatus it is for instance possible to mould a vessel together with the corresponding cover. This is effected by first moulding the vessel, an impervious metal sheet of the shape shown in Fig. 2 being used. The inserted part $e$ will in this case be placed immediately below the impervious part $b$, so that the rebate is formed at the top. If the corresponding cover is to be made in the same mould, it is of course imperative that the cover should fit the vessel accurately. This can be effected according to the present invention by extending the impervious part $b$ to near the bottom, as shown in Fig. 1, so that at the bottom room is left for the cover. On the cover being made by introducing the fibrous pulp and the gaseous pressure medium, the cover will fit exactly on to the previously made vessel.

Having now particularly described and ascertained the nature of my said invention and in what manner the same is to be performed, I declare that what I claim is:—

1. An apparatus for the production of hollow bodies from fibrous pulp by means of a heated gaseous medium under pressure, comprising a stationary mould capable of being taken apart, having pervious walls and of greater height than the article to be moulded therein as set forth.

2. An apparatus for the production of hollow bodies from fibrous pulp by means of a heated gaseous medium under pressure, comprising a mould stationary during the moulding and capable of being taken apart, having pervious walls and of greater height than the article to be moulded therein, and a removable member having impervious walls, said member being intended to extend down to the upper edge of the article to be moulded, as set forth.

3. An apparatus for the production of hollow bodies from fibrous pulp by means of a heated gaseous medium under pressure, comprising a mould stationary during the moulding and capable of being taken apart, having impervious walls overhanging inwardly at the top and being intended to extend down to the upper edge of the article to be moulded, means for introducing the fibrous pulp into the mould, a connecting member for connecting said means to the said removable member, said pressure member being intended to rest on the upper edge of the removable member so as to form a pressure tight joint therewith, as set forth.

4. An apparatus for the production of hollow bodies from fibrous pulp by means of a heated gaseous medium under pressure, comprising a mould stationary during the moulding and having a pervious part and a pervious member intended to be placed upon said pervious part, whereby a rebate can be formed on the article to be moulded and articles of different height may be made in the same mould, as set forth.

In testimony whereof I have signed my name to this specification.

ROBERT LECHTHALER.